United States Patent [19]

Koster

[11] Patent Number: 5,510,787
[45] Date of Patent: Apr. 23, 1996

[54] SYSTEM COMPRISING AT LEAST ONE ENCODER FOR CODING A DIGITAL SIGNAL AND AT LEAST ONE DECODER FOR DECODING A DIGITAL SIGNAL, AND ENCODER AND DECODER FOR USE IN THE SYSTEM ACCORDING TO THE INVENTION

[75] Inventor: Arian Koster, Mydrecht, Netherlands

[73] Assignee: Koninklijke PTT Nederland N.V., Groningen, Netherlands

[21] Appl. No.: 119,740

[22] Filed: Sep. 10, 1993

[30] Foreign Application Priority Data

Sep. 22, 1992 [NL] Netherlands ............................ 9201640

[51] Int. Cl.⁶ ................................................. H04N 11/02
[52] U.S. Cl. .............................. 341/76; 348/409; 348/415
[58] Field of Search .................................. 341/50, 51, 67, 341/76; 348/400–402, 409–413, 415, 416

[56] References Cited

U.S. PATENT DOCUMENTS

| | | | |
|---|---|---|---|
| 4,518,950 | 5/1985 | Petr | 341/76 |
| 4,549,304 | 10/1985 | Weirich et al. | 375/27 |
| 4,958,226 | 9/1990 | Haskell et al. | 358/136 |
| 4,999,705 | 3/1991 | Puri | 358/136 |
| 5,063,443 | 11/1991 | Okajima et al. | 358/133 |
| 5,068,724 | 11/1991 | Krause et al. | 358/133 |
| 5,173,773 | 12/1992 | Ueda et al. | 358/136 |
| 5,253,058 | 10/1993 | Gharavi | 358/136 |

FOREIGN PATENT DOCUMENTS

| | | |
|---|---|---|
| 0113934 | 7/1984 | European Pat. Off. . |
| 9206563 | 4/1992 | WIPO . |

OTHER PUBLICATIONS

Vandendorpe, "Hierarchical Transform and Subband Coding of Video Signals", Signal Processing: Image Communication 4, No. 3, Jun. 1992, pp. 245–262.

Parke, "Coded Representation of Picture and Audio Information", ISO–IEC/JTC1/SC29/WG11/MPEG92/291, 1992, pp. 1–9.

Hammer, et al., "Hierarchial Encoding of Image Sequences Using Multistage Vector Quantization", 1987 International Conference on Acoustics, Speech and Signal Processing, Apr. 1987, pp. 25.2.1–25.2.4.

Tourtier et al., "Motion Compensated Subband Coding Schemes for Compatible High Definition TV Coding", Signal Processing: Image Communication 4, vol. 4, No. 4/5, Aug. 1992, pp. 325–344.

*Primary Examiner*—Marc S. Hoff
*Attorney, Agent, or Firm*—Peter L. Michaelson

[57] ABSTRACT

Known systems based on layered coding and decoding do not take account of the greater surface area of an HDTV picture, which is to be coded with high resolution, compared with the smaller surface area of a conventional picture, to be derived therefrom, which is to be coded with low resolution. An improvement in the efficiency of the coding and decoding is achieved by actually taking account of this with the system according to the invention and maintaining the coupling between the two layers in the encoder and the decoder if a picture element is situated in a corresponding section of the two pictures and interrupting the coupling if a picture element is situated outside the corresponding section of the two pictures.

10 Claims, 3 Drawing Sheets

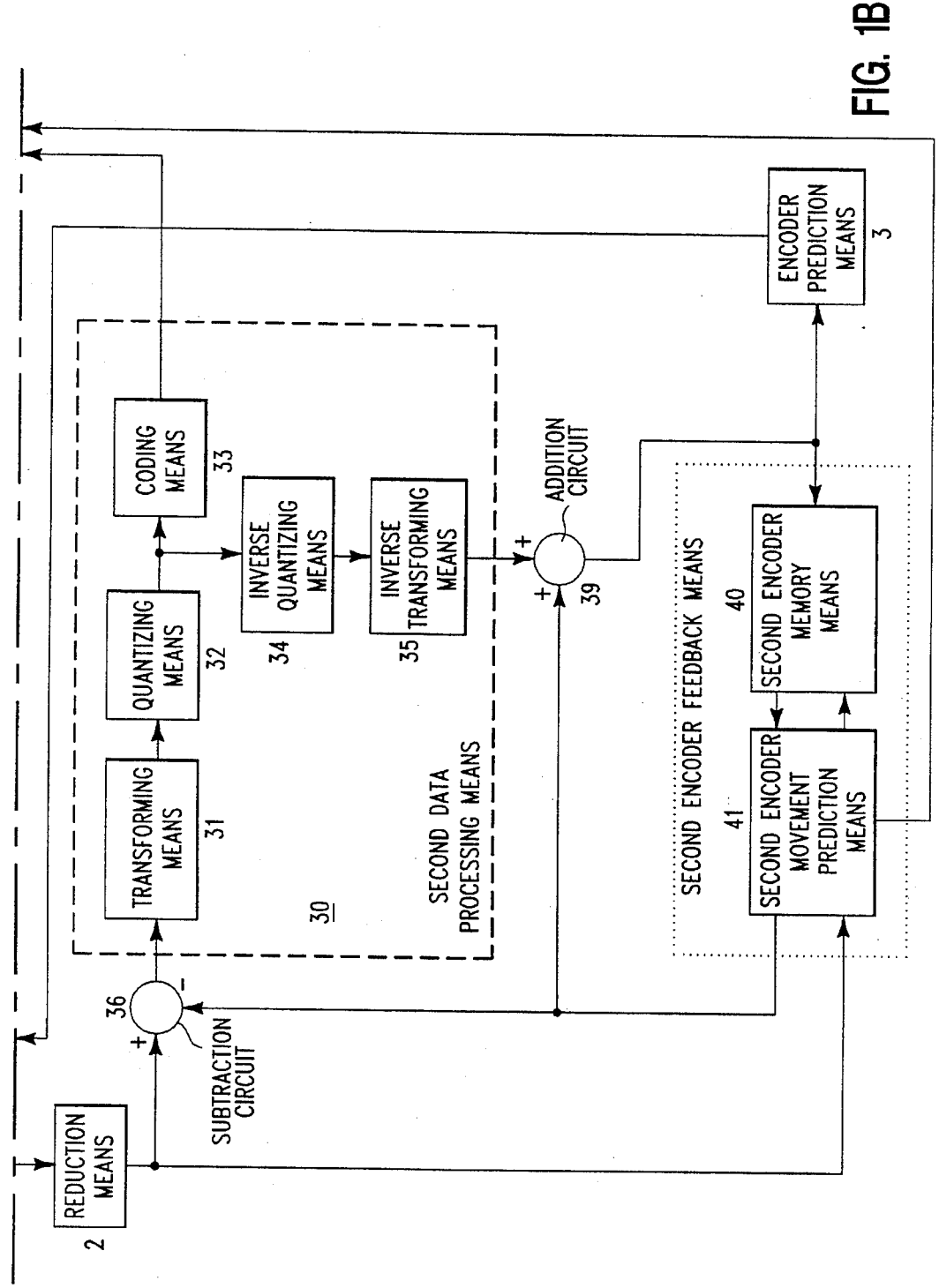

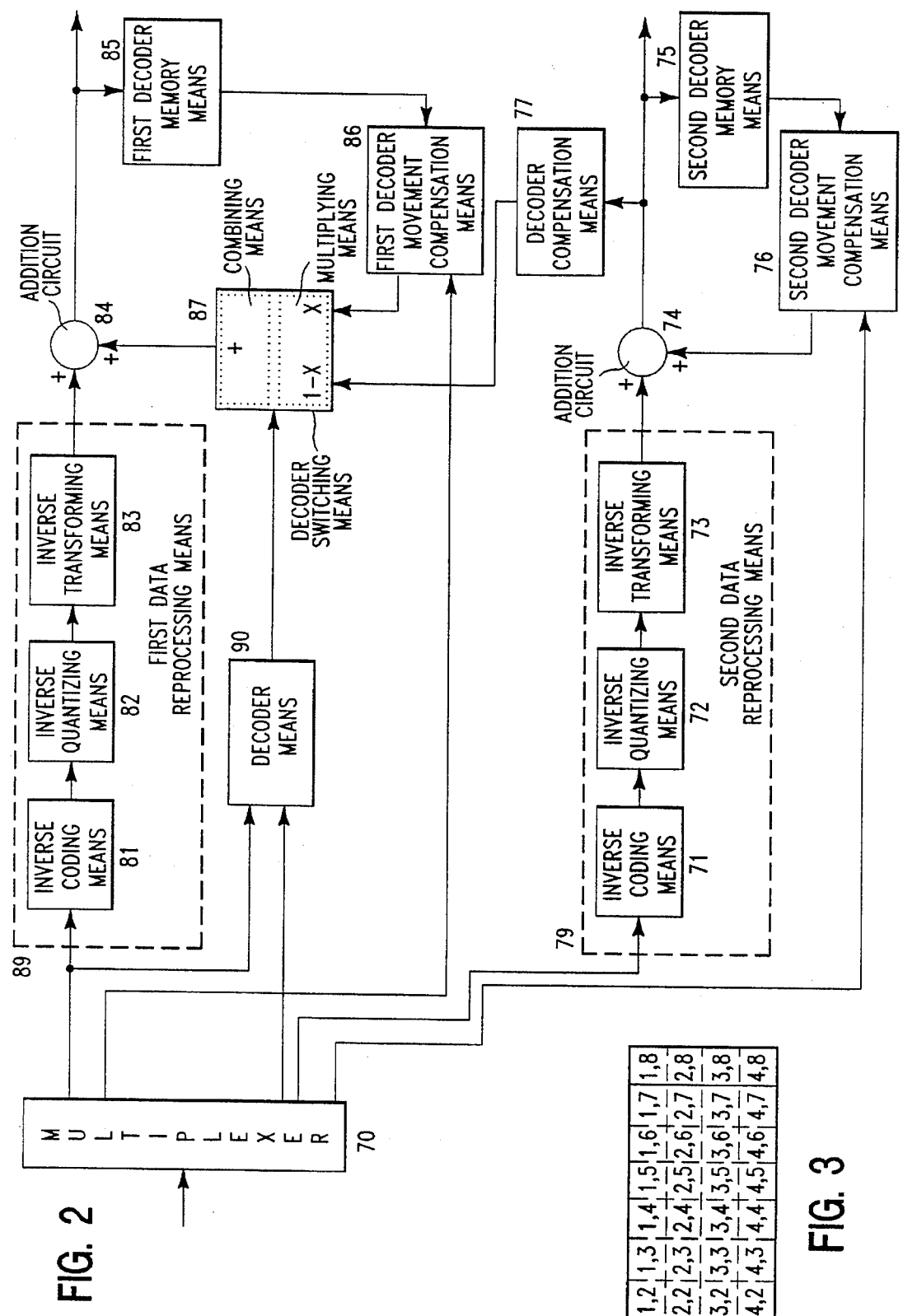

SYSTEM COMPRISING AT LEAST ONE ENCODER FOR CODING A DIGITAL SIGNAL AND AT LEAST ONE DECODER FOR DECODING A DIGITAL SIGNAL, AND ENCODER AND DECODER FOR USE IN THE SYSTEM ACCORDING TO THE INVENTION

BACKGROUND OF THE INVENTION

The invention relates to a system comprising at least one encoder for coding a digital signal and at least one decoder for decoding a coded digital signal, which encoder is provided with an input for receiving the digital signal,
first data processing means, coupled to the input, for generating a first coded digital signal,
first encoder feedback means for feeding back at least a section of the first data processing means, which first encoder feedback means comprise first encoder memory means,
reduction means, coupled to the input, for reducing the received digital signal,
second data processing means, coupled to the reduction means, for generating a second coded digital signal,
second encoder feedback means for feeding back at least a section of the second data processing means, which second encoder feedback means comprise second encoder memory means, and
encoder coupling means for coupling the second encoder feedback means to the first encoder feedback means, which encoder coupling means comprise encoder prediction means,
and which decoder is provided with
first data reprocessing means for processing a first coded digital signal,
first decoder memory means which are coupled to the first data reprocessing means,
second data reprocessing means for processing a second coded digital signal,
second decoder memory means which are coupled to the second data reprocessing means, and
decoder coupling means for coupling the second decoder memory means to the first decoder memory means, which decoder coupling means comprise decoder prediction means.

Such a system is known from "Coded representation of picture and audio information", "TMI Compatibility Experiments", by I. Parke, ISO-IEC/JTC1/SC29/WG11, MPEG92/291, in particular FIG. 1 (the encoder) and FIG. 2 (the decoder) thereof. The encoder based on layered coding comprises the input for receiving the digital signal to be coded, such as, for example, a television signal made up of picture elements (pixels or pels), and the first data processing means, coupled to the input, for generating the first coded digital signal (indicated by "T", "Q" in the abovementioned FIG. 1). The encoder furthermore comprises the first encoder feedback means for feeding back at least a section of the first data processing means in order to make the coding proceed more efficiently. The first encoder feedback means comprise the encoder memory means, and first encoder movement prediction means (indicated as a whole by "Mc" in the abovementioned FIG. 1) which may be situated in series therewith. The encoder also comprises the reduction means, coupled to the input, for reducing the received digital signal, the second data processing means, coupled to the reduction means, for generating a second coded digital signal, and the second encoder feedback means for feeding back at least a section of the second data processing means in order to make the coding proceed more efficiently. The second encoder feedback means comprise the second encoder memory means and second encoder movement prediction means, which may be situated in series therewith, and are coupled, via the encoder coupling means, to the first encoder feedback means (the reduction means, second data processing means and second encoder primary means are not shown directly in the abovementioned FIG. 1 but are evident therefrom, in a manner known to the person skilled in the art, because they are indicated symbolically by "MPEG-1"). The encoder coupling means comprise the encoder prediction means (indicated by "Uc" in the abovementioned FIG. 1).

Such a system, provided with first and second data processing means, is, as it were, made up of two layers: the first data processing means generate the first coded digital signal, which has the highest resolution because said signal is obtained by processing the received digital signal, and the second data processing means generate the second coded digital signal, which has the lowest resolution because said signal is obtained by processing the received digital signal reduced by the reduction means. The two signals are then transmitted by means of multiplexing and demultiplexing to the decoder, which is based on layered decoding and which, in the case of coding on the basis of high resolution, uses both signals and, in the case of decoding on the basis of low resolution, uses only the second coded digital signal. The decoder comprises the first data reprocessing means for processing a first coded digital signal (indicated by, respectively, "$Q^{-1}$", "$T^{-1}$" and by "MPEG-2 bits" in the abovementioned FIG. 2), the first decoder memory means (and decoder movement compensation means which may be situated in series therewith, indicated as a whole by "Mc" in the abovementioned FIG. 2), which are coupled to the first data reprocessing means, the second data reprocessing means for processing a second coded digital signal (indicated by, respectively, "$Q^{-1}$", "$T^{-1}$" and by "MPEG-1 bits" in the abovementioned FIG. 2), and the second decoder memory means (and second decoder movement compensation means which may be situated in series therewith, indicated as a whole by "Mc" in the abovementioned FIG. 2) which are coupled to the second data reprocessing means and, via the decoder coupling means, to the first decoder memory means. The decoder coupling means comprise the decoder prediction means (indicated by "Uc" in the abovementioned FIG. 2).

The known system has the disadvantage that it exhibits a certain inefficiency in coding and decoding if the layer which codes with high resolution codes a signal which corresponds, for example, to an HDTV picture and the layer which codes with low resolution codes a signal corresponding to a conventional tv picture derived from the HDTV picture.

SUMMARY OF THE INVENTION

The object of the invention is to provide a system of the type mentioned in the preamble which codes and decodes more efficiently in the case of the given, different tv standards.

For this purpose, the system according to the invention has the characteristic that the encoder is provided with encoder means, coupled to the input,
for deriving a position code from the digital signal, for comparing the position code with at least one adjustable code, and for decoupling, subject to a comparison result, the second encoder feedback means and the first encoder feedback means.

According to an HDTV (high definition television) standard, an HDTV picture which, prior to coding, corresponds to the digital signal to be coded and, after coding, corresponds to the first coded digital signal (the high-resolution signal) should have dimensions with a ratio of 16:9, while a conventional picture which, prior to coding, corresponds to the reduced digital signal to be coded and, after coding corresponds to the second coded digital signal (the low-resolution signal) should have dimensions with a ratio of 4:3. Under these conditions, the surface area of the HDTV picture will generally exceed the surface area of the conventional picture, in which case the HDTV picture can be divided up into a section which corresponds to the conventional picture (the corresponding section) and into a section which exceeds (the exceeding section). Whether a picture element is situated in the corresponding section or in the exceeding section of the HDTV picture is determined by deriving, with the encoder means, the position code from the digital signal to be coded and comparing it with the adjustable code. If the picture element is situated in the corresponding section, the layer which codes with low resolution should be coupled to the layer which codes with high resolution in order to be able to serve, if necessary, as a prediction in the latter because both layers code corresponding picture elements with different resolution and prediction is therefore among the possibilities. If the picture element is situated in the exceeding section of the HDTV picture, the layer which codes with low resolution must not be coupled to the layer which couples with high resolution because the layer which codes with low resolution must not serve as a prediction in the latter (since the picture element is situated outside the actual working region of the layer which codes with low resolution and prediction is therefore not among the possibilities), and this is achieved by decoupling the second encoder feedback means from the first encoder feedback means.

In this connection, the decoupling should be interpreted with a very wide meaning. If the system is, for example, furthermore constructed as described in Dutch Patent Application No. 9200499 (priority date 17th Mar. 1992), which is not yet laid open, in which the encoder prediction means are connected both to an input of the first data processing means and to an input of the first encoder feedback means in order to prevent the presence of nested loops in the decoder, the decoupling could be achieved by providing, in a coupling, a switch which is set to the nonconducting state, in which case the decoder would also have to be provided with such a switch. The decoupling could also be achieved by providing, in a coupling, a logic circuit which, in response to a control signal, converts a signal (an arbitrary number), originating from the layer which codes with low resolution and intended for the layer which codes with low resolution, into a meaningless signal (for example, the number zero). In this case, the decoder would also have to be provided with such a logic circuit.

If the position code comprises an (x,y) coordinate and a corner point of the HDTV picture coincides with a corner point of the conventional tv picture, it is sufficient to compare said position code with one adjustable code (another (x,y) coordinate) in order to be able to determine if a picture element is situated in a corresponding or exceeding section. If the two corner points do not coincide, at least two adjustable codes will be necessary. If the position code comprises a single number, the manner of numbering picture elements (for example from left to right and then from top to bottom) to be distinguished in the HDTV picture and whether both corner points do or do not coincide determine with how many adjustable codes comparison should be made. The adjustable code is adjusted in the case of the encoder, for example, by determining with a joystick which section of the HDTV picture should be visible as a conventional picture.

The increase in the efficiency of the coding and decoding of the system according to the invention becomes possible because the system ignores picture elements situated in the exceeding section in coding with low resolution and in predicting the coding with high resolution on the basis of signals coded with low resolution.

The invention is based on the insight that if a digital signal representing an HDTV picture is to be coded with high resolution and a signal, derived therefrom and representing a conventional and smaller picture, is to be coded with low resolution, it is inefficient to code the derived signal taken over the whole surface area of the HDTV picture with low resolution and to use it in predicting the coding with high resolution.

A first embodiment of the system according to the invention has the characteristic that the encoder coupling means are provided with encoder switching means, controllable via the encoder means, of which a main contact is coupled to the input, of which a first switch contact is coupled to the first encoder memory means and of which a second switch contact is coupled to the second encoder memory means via the encoder prediction means, the decoder coupling means being provided with decoder switching means, controllable via the decoder means, of which a main contact is coupled to the first data reprocessing means, of which a first switch contact is coupled to the first decoder memory means and of which a second switch contact is coupled to the second decoder memory means via the decoder prediction means.

In this case, the encoder switching means and the decoder switching means are designed, for example, as switch-over means, that is to say the main contact is connected through either to the first switch contact or to the second switch contact. If, subject to a "system controller" the main contact of the encoder switching means is connected through to the first switch contact, the previous high-resolution picture stored in the first encoder memory means is used in order to predict the new high-resolution picture. If, subject to the "system controller", the main contact of the encoder switching means is connected through to the second switch contact, the current low-resolution picture is used to predict the new high-resolution picture. The information needed for this, which originates from the "system controller", is also transmitted by means of multiplexing and demultiplexing to the decoder so that the decoder switching means are in a synchronous state with the encoder switching means. Both in the encoder and in the decoder, the two layers can be decoupled by connecting the main contact of the switching means through to the first switch contact. For this purpose, the encoder means should be able to influence the control information originating from the "system controller", for example via a logic circuit to be sited between the "system controller" and the encoder switching means. In this connection, it is also conceivable that the "system controller" comprises the encoder means.

The encoder switching means and the decoder switching means may furthermore be designed as means for adjusting a ratio of signals present at the first switch contact and second switch contact and for then combining the two signals adjusted in this way. As described in Dutch Patent Application No. 9201594 (priority date 14 Sep. 1992), which has not yet been laid open, the switching means can be equipped for multiplying the signal present at the first switch contact by the value x and for multiplying the signal present at the second switch contact by the value 1−x, where $0 \leq x \leq 1$. In this case, it is also possible, by setting x=1, to achieve the result that the two layers in the encoder and the decoder are decoupled.

A second embodiment of the system according to the invention has the characteristic that the decoder is provided with decoder means for deriving the position code from a coded digital signal and for receiving the adjustable code, for comparing the position code with the adjustable code, and for decoupling, subject to a comparison result, the second decoder memory means and the first decoder memory means.

Whether a picture element is situated in the corresponding section or in the exceeding section of the HDTV picture is determined by deriving, with the decoder means, the position code from a coded digital signal and comparing it with the adjustable code. If the picture element is situated in the corresponding section, the layer which decodes with low resolution should be coupled to the layer which decodes with high resolution in order to be able, if necessary, to serve as a prediction in the latter because the two layers decode corresponding picture elements with different resolution and prediction is therefore among the possibilities. If the picture element is situated in the exceeding section of the HDTV picture, the layer which decodes with low resolution must not be coupled to the layer which decodes with high resolution because the layer which decodes with low resolution cannot serve as a prediction in the latter (since the picture element is situated outside the actual working region of the layer which decodes with low resolution and prediction is now therefore not among the possibilities), and this is achieved by decoupling the second decoder memory means from the first decoder memory means.

This achieves a maximum improvement in the efficiency of the coding and decoding by the system because now only the adjustable code has to be transmitted from the encoder to the decoder by means of the multiplexer and the demultiplexer and because, as a result, the encoder and the decoder have to take account of the difference in surface area between the HDTV picture and the conventional picture only as a function of the derived position code and the adjustable code. If the decoder is not provided with the decoder means, the encoder will also have to transmit all kinds of elaborate control information so that the decoding process nevertheless proceeds synchronously in the various layers of the decoder (the decoding of signals corresponding to pictures having different surface areas will, after all, result in asynchronism between the layers). If the decoder is provided with decoder means, internal synchronism is automatically ensured without the elaborate control information having to be transmitted at the same time, and this has a positive effect on the efficiency.

The invention furthermore relates to an encoder for use in the system according to the invention, comprising an input for receiving the digital signal, first data processing means, coupled to the input, for generating a first coded digital signal, first encoder feedback means for feeding back at least a section of the first data processing means, which first encoder feedback means comprise first encoder memory means, reduction means, coupled to the input, for reducing the received digital signal, second data processing means, coupled to the reduction means, for generating a second coded digital signal, second encoder feedback means for feeding back at least a section of the second data processing means, which second encoder feedback means comprise second encoder memory means, and encoder coupling means for coupling the second encoder feedback means to the first encoder feedback means, which encoder coupling means comprise encoder prediction means, The encoder according to the invention has the characteristic that the encoder is provided with encoder means, coupled to the input, for deriving a position code from the digital signal, for comparing the position code with at least one adjustable code, and for decoupling, subject to a comparison result, the second encoder feedback means and the first encoder feedback means.

A first embodiment of the encoder according to the invention has the characteristic that the encoder coupling means are provided with encoder switching means, controllable via the encoder means, of which a main contact is coupled to the input, of which a first switch contact is coupled to the first encoder memory means and of which a second switch contact is coupled to the second encoder memory means via the encoder prediction means.

The invention yet furthermore relates to a decoder for use in the system according to the invention, comprising first data reprocessing means for processing a first coded digital signal, first decoder memory means which are coupled to the first data reprocessing means, second data reprocessing means for processing a second coded digital signal, second decoder memory means which are coupled to the second data reprocessing means, and decoder coupling means for coupling the second decoder memory means to the first decoder memory means, which decoder coupling means comprise decoder prediction means.

The decoder according to the invention has the characteristic that the decoder is provided with decoder means for deriving the position code from a coded digital signal and for receiving the adjustable code, for comparing the position code with the adjustable code, and for decoupling, subject to a comparison result, the second decoder memory means and the first decoder memory means.

A first embodiment of the decoder according to the invention has the characteristic that the decoder coupling means are provided with decoder switching means, controllable via the decoder means, of which a main contact is coupled to the first data reprocessing means, of which a first switch contact is coupled to the first decoder memory means and of which a second switch contact is coupled to the second decoder memory means via the decoder prediction means.

REFERENCE

"Coded representation of picture and audio information", "TMI Compatibility Experiments", by I. Parke, ISO-IEC/JTC1/SC29/WG11, MPEG92/291

EXEMPLARY EMBODIMENT

The invention will be explained in greater detail by reference to an exemplary embodiment shown in the figures.

In the figures:

FIG. 2 shows a decoder according to the invention, and

FIG. 3 shows an HDTV picture and a conventional picture provided with position codes.

Figure 1A:
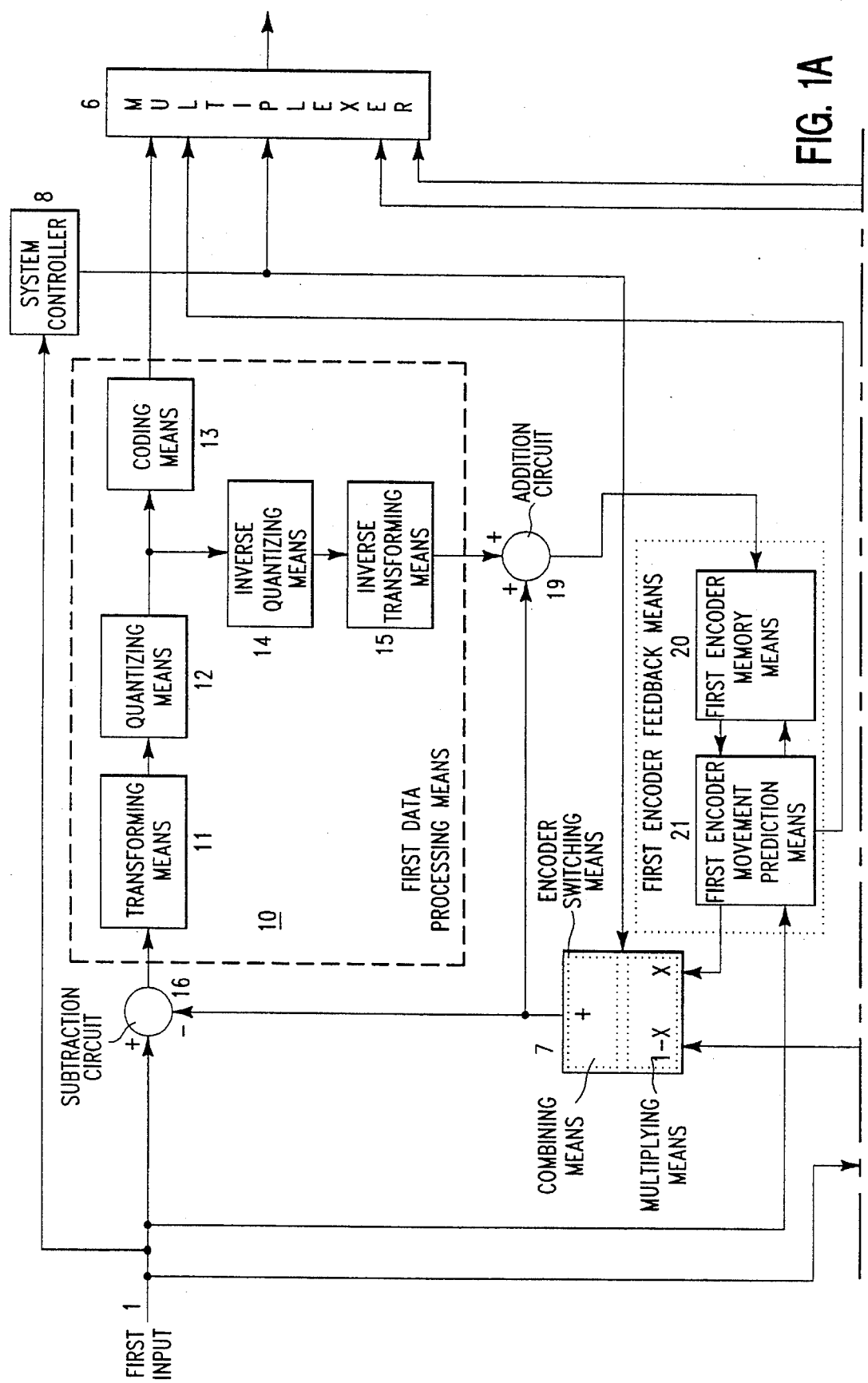
FIG. 1 shows an encoder according to the invention.

The encoder shown in FIG. 1 is made up of two layers. The first layer (10–21) codes signals on the basis of the highest resolution and the second layer (30–41) codes signals on the basis of the lowest resolution.

The first layer comprises first data processing means 10, which are made up of a series circuit of transforming means 11, quantizing means 12 and coding means 13 and of a series connection, coupled to a branching point situated between the quantitizing means 12 and coding means 13, of inverse quantizing means 14 and inverse transforming means 15. An input of the transforming means 11 forms an input of data processing means 10, which is coupled to an output of subtraction circuit 16. An output of coding means 13 forms a coding output of data processing means 10 for generating a first coded digital signal on the basis of the high resolution, which coding output is coupled to a first input of a multiplexer 6. An output of inverse transforming means 15 forms a feedback output of data processing means 10 for (at least partially) feeding back said data processing means 10, which feedback output is coupled to a first (plus) input of addition circuit 19. An output of addition circuit 19 is coupled to an input of first encoder memory means 20. These are bidirectionally coupled to first encoder movement prediction means 21, of which a vector output for generating a first vector signal is coupled to a second input of multiplexer 6. An input of encoder movement prediction means 21 is coupled to an input 1 of the encoder, which input 1 is furthermore coupled to a first (plus) input of subtraction circuit 16. A second (minus) input of the latter is coupled to a second (plus) input of addition circuit 19 and to an output (main contact) of encoder switching means 7, of which a first input (first switch contact) is coupled to a further output of encoder movement prediction means 21. A control input of encoder switching means 7 is coupled to a fifth input of multiplexer 6 and to an output of a system controller 8, of which an input is coupled to the input 1. The system controller 8 transmits an x-signal which represents the value of x to the encoder switching means 7 and to the multiplexer 6, which then transmits the x-signal to the decoder in multiplexed form. Encoder switching means 7 are equipped for adjusting the ratio of the signals present at the first input and second input by multiplying the signal present at the first input (originating from the first encoder movement prediction means 21) by the value x and by multiplying the signal present at the second input (originating from the encoder prediction means 3) by the value 1−x and by then adding the two signals obtained in this way. For the value x it is the case that $0 \leq x \leq 1$, which value is determined by the system controller 8, in a manner to be considered later, and is adjusted by means of the control input of the encoder switching means 7. The first encoder memory means 20 and the first encoder movement prediction means 21 together form the first encoder feedback means.

The second layer comprises second data processing means 30, which are made up of a series connection of transforming means 31, quantizing means 32 and coding means 33 and of a series connection, coupled to a branching point situated between the quantizing means 32 and coding means 33, of inverse quantizing means 34 and inverse transforming means 35. An input of transforming means 31 forms an input of data processing means 30, which is coupled to an output of subtraction circuit 36. An output of coding means 33 forms a coding output of data processing means 30 for generating a second coded digital signal on the basis of the low resolution, which coding output is coupled to a third input of a multiplexer 6. An output of inverse transforming means 55 forms a feedback output of data processing means 30 for (at least partially) feeding back said data processing means 30, which feedback output is coupled to a first (plus) input of addition circuit 39. An output of addition circuit 39 is coupled to an input of second encoder memory means 40. These are bidirectionally coupled to second encoder movement prediction means 41, of which a vector output for generating a second vector signal is coupled to a fourth input of multiplexer 6. An input of encoder movement prediction means 41 is coupled to an output of reduction means 2 for reducing the received signal, which output is furthermore coupled to a first (plus) input of subtraction circuit 36. A second (minus) input of the latter is coupled to a further output of encoder movement prediction means 41, which further output is furthermore coupled to a second (plus) input of addition circuit 39. Reduction means 2, of which an input is coupled to the input 1 of the encoder, comprise filtering means and subsampling means. The output of addition circuit 39 is furthermore coupled to an input of encoder prediction means 3 for coupling data processing means 30 to data processing means 10. An output of encoder prediction means 3 is coupled to a second input (a second switch contact) of encoder switching means 7. Encoder prediction means 3 comprise interpolating means and upsampling means. At the same time, the second encoder memory means 40 and the second encoder movement prediction means 41 together form the second encoder feedback means.

The operation of the encoder shown in FIG. 1 is as follows. The digital signal to be coded is presented to input 1 as a bit stream, a predetermined number of bits in each case forming a picture element (pixel or pel). Assuming that the encoder switching means are adjusted with x=1 and that the content of the first encoder memory means 20 is vacant, a first group of pels reaches the data processing means 10 via subtraction circuit 16. The transforming means 11 carry out, for example, a discrete cosine transformation on the group of pairs, which determines the associated coefficient for each frequency component. The quantizing means 12 quantize the signal obtained. The quantized signal is then coded by coding means 13, for example on the basis of a two-dimensional table which generates new codewords which, on average, have a shorter length than the incoming words, and fed to multiplexer 6. This transformed, quantized and coded first group of pels consequently forms the first section of the signal coded on the basis of the high resolution. After being transformed and quantized, the first groups of pels is inversely quantized by inverse quantizing means 14 and inversely transformed by inverse transforming means 15, and stored, via addition circuit 19, in a first location in encoder memory means 20. A second group of pels traverses the same route as the first group of pels, undergoes the same processing and is stored in a second location in encoder memory means 20, etc. until all the groups of pels of one complete picture (the first picture) have been stored.

The first group of pels of the next (second) picture is then presented at input 1 and fed to encoder movement prediction means 21 which, on the basis of the preceding (first) picture stored in encoder memory means 20, investigate whether there is a possibility of a certain movement taking place. If this is so, said movement is fed in the form of the first vector signal to multiplexer 6. At the same time, encoder memory means 20 generate the first group of pels of the preceding (first) picture, which first group of pels is subtracted, via encoder movement prediction means 21 and via encoder switching means 7 (because the latter are adjusted with x=1) from the first group of pels of the (second) picture to be coded by means of subtraction circuit 16. Because the difference between the first group of pels of the second picture and the first group of pels of the first picture is then presented to data processing means 10, the coding proceeds appreciably more efficiently. The fact that the encoder prediction means take account of possible movements in the picture content of the subsequent pictures increases the efficiency even further. Instead of vectors, of course, other prediction parameters determined on the basis of other prediction methods may also be transmitted.

What is described above is the operation of the encoder as regards the first layer, which is constructed around data processing means 10, the encoder switching means being adjusted with x=1. The operation as regards the second layer, constructed around data processing means 30, is in principle identical (given the adjustment x=1), with the exception of the following. Data processing means 30 receive, via subtraction circuit 36, the received signal, which has been reduced via reduction means 2 and which has a lower resolution than the signal presented at input 1 as a consequence of the filtering and subsampling. The coded signal generated by data processing means 30 is consequently coded on the basis of a lower resolution (the low resolution).

If the encoder means are adjusted with x=1, the first group of pels of the preceding (first) picture is subtracted from the first group of pels of the (second) picture to be coded by means of subtraction circuit 16. As a result, a section of the stored preceding, high-resolution picture is used in order to predict a section of the new high-resolution picture to be coded. If the section of the stored preceding, high-resolution picture only slightly resembles, or does not resemble, the corresponding section of the new high-resolution picture to be coded, a decision may be made to base the prediction on a section of the new low-resolution picture. In that case, the encoder switching means should be adjusted with x=0. Although the efficiency of the data processing means was increased in the case where x=1 because it was only necessary to code the difference between the first group of pels of the second picture and the first group of pels of the first picture, in the case where x=0, the efficiency of the data processing means 10 is also increased because, as a consequence of the coupling of the second layer to the first layer via encoder prediction means 3 a group of pels, coarsely coded in the second layer, only have to be coded still more finely in the first layer. The interpolating and upsampling by encoder prediction means 3 is necessary because of the different levels of resolution between the two layers.

The two types of predictions are combined if a value between 0 and 1 is chosen for x. If x=½, the two types of predictions are of equal weight. If x<½, the prediction based on the current low-resolution picture weighs more heavily, and if x>½, the prediction based on the preceding, high-resolution picture weighs more heavily. With a correctly chosen value of x, it appears possible to achieve 3 dB gain in the prediction with respect to a system in which the encoder switching means are designed as a change-over switch (that is to say with only the possibility of x=0 or x=1). The optimum value of x is determined by the system controller 8, which investigates, for example, for every possible value of x how many bits are needed at the coding output of the data processing means 10 in order to reproduce a coded section of a picture. In this case, a further input (not shown in FIG. 1) of the system controller 8 is coupled to the output of data processing means 10. The value of x which requires the fewest bits in this case forms the optimum value. The further input, not shown in FIG. 1, of the system controller 8 could also be coupled to the output of subtraction circuit 16, the square of the result signal (difference signal or error signal) present at this output having to be calculated for every value of x. The value of x which yields the smallest error then forms the optimum value.

In the encoder shown in FIG. 1, the system controller 8 comprises the encoder means
for deriving a position code from the digital signal,
for comparing the position code with at least one adjustable code, and
for decoupling, subject to a comparison result, the second encoder feedback means and the first encoder feedback means.

For this purpose, the encoder means are coupled to the input 1 and they are provided, for example, with a counter which derives the position code from the bit stream to be coded. Furthermore, the encoder means are coupled, for example, to a joystick which is operated by a human being (in order to determine therewith which section of the 16:9 HDTV picture should be coded with lower resolution as 4:3 conventional picture) and which generates the adjustable code which is fed to the encoder means. Furthermore, the encoder means are provided, for example, with a comparator for comparing position code derived by means of using the counter with the adjustable code originating from the joystick. Depending on the comparison result, the comparator generates, for example, a logic one if the respective picture element (referred to the position code) is situated outside the conventional picture (or in the exceeding section of the HDTV picture) and the comparator generates, for example, a logic zero if the respective picture element (referred to the position code) is situated inside the conventional picture (or in the corresponding section of the HDTV picture). If the output signal of the comparator is fed to a first input of an OR gate and the x-signal to a second input thereof, the x-signal appears at the output of the OR gate if the respective picture element is in the corresponding section and a logic one appears at the output if the respective picture element is situated in the exceeding section. Feeding the output signal from the OR gate as a new x-signal to the encoder switching means 7 achieves the result that, if the respective picture element is situated in the exceeding section, the encoder switching means are adjusted with x=1 (regardless of the value of x generated by the system controller 8), as a result of which the first and second encoder feedback means are decoupled. The same is true, of course, for encoder switching means which are designed as switch-over means and, consequently, only have the values x=0 and x=1.

If the system is constructed as described in Dutch Patent Application No. 9200499 (priority date 17 Mar. 1992), which is not yet laid open, in which the encoder prediction means 3 are connected both to an input of the first data processing means 10 and to an input of the first encoder memory means 20 in order to prevent nested loops in the decoder and in which the encoder switching means 7 are then absent, the decoupling could be achieved by providing, in a coupling (for example between encoder memory means 40 and encoder prediction means 3), a switch which is set to the nonconducting state. The decoupling can also be achieved by providing, in a coupling, a logic circuit which, in response to a control signal, converts a signal (an arbitrary number) which originates from the layer which codes with low resolution and is intended for the layer which codes with high resolution into a meaningless signal (for example the number zero). Setting the switch to the nonconducting state can in this case be controlled by the abovementioned comparator which could also furthermore supply the control signal.

The encoder should not comprise less than two layers, in which case the coded signal having the high resolution is suitable, for example, for reproducing so-called high-definition television pictures and the coded signal having the low resolution is suitable for reproducing standard television pictures. If the encoder comprises three layers, signals could be coded with the third layer for reproducing, for example, pictures for a so-called videophone, in which a yet lower resolution is sufficient.

The decoder shown in FIG. 2 comprises a demultiplexer 70, having an input for receiving the multiplexed signal which originates from the encoder and which comprises the first coded digital signal, which has the highest resolution, the first vector signal, the second coded digital signal, which has the lowest resolution, the second vector signal, and the x-signal and the adjustable code. At a first output of demultiplexer 70, there appears the first coded digital signal, at a second output of demultiplexer 70 there appears the first vector signal, at a third output of demultiplexer 70 there appears the second coded digital signal, at a fourth output of demultiplexer 70 there appears the second vector signal and at a fifth output of demultiplexer 70 there appears the x-signal and the adjustable code. The first output of the demultiplexer 70 is coupled to an input of first data reprocessing means 89, which comprise a series connection of inverse coding means 81, inverse quantizing means 82 and inverse transforming means 83, and of which an output is coupled to a first input of addition circuit 84. An output of addition circuit 84 forms a first (high-resolution) output of the decoder and is coupled to an input of first decoder memory means 85, and an output of the latter is coupled to an input of first decoder movement compensation means 86. A vector input of the latter is coupled to the second output of demultiplexer 70 for receiving the (first) vector signal and an output is coupled to a first input (a first switch contact) of decoder switching means 87, of which an output is coupled to a second input of addition circuit 84. A control input of decoder circuit means 87 is coupled to an output of decoder means 90, of which a first input is coupled to the fifth output of demultiplexer 70 for receiving the x-signal and the adjustable code and of which a second input is coupled to the first output of demultiplexer 70 for receiving the first coded digital signal and deriving therefrom the position code.

The third output of demultiplexer 70 is coupled to an input of second data reprocessing means 79, which comprise a series connection of inverse coding means 71, inverse quantizing means 72 and inverse transforming means 73. An output of the latter is coupled to the first input of addition circuit 74, of which an output is coupled via decoder prediction means 77, which comprise interpolating means and upsampling means, to a second input (a second switch contact) of decoder switching means 87. The output of addition circuit 74, which forms a second (low-resolution) output of the decoder, is also coupled to an input of second decoder memory means 75, and an output of the latter is coupled to an input of second decoder movement compensation means 76. An output of the latter is coupled to a second input of addition circuit 74 and a vector input is coupled to the fourth output of demultiplexer 70 for receiving the (second) vector signal.

The operation of the decoder shown in FIG. 2 is as follows. First data reprocessing means 89 carry out, via inverse coding means 81, an inverse coding on the first coded digital signal, for example on the basis of a table, they then carry out, via inverse quantizing means 82, an inverse quantizing and after that they carry out, via inverse transforming means, an inverse transformation, for example an inverse discrete cosine transformation. Second data reprocessing means 79 carry out, via inverse coding means 71, an inverse coding on the second coded digital signal, for example on the basis of a table, they then carry out, via inverse quantizing means 72, an inverse transformation, and after that they carry out, via inverse transforming means 73, an inverse transformation, for example an inverse discrete cosine transformation. The signal generated by second data reprocessing means 79 has the low resolution and forms the difference between a particular group of pels of a particular picture and a particular group of pels of a picture prior thereto. With the aid of addition circuit 74, second decoder memory means 75 and second decoder movement compensation means 76, the particular group of pels of the particular picture then appears at the second (low-resolution) output of the decoder. This signal is interpolated and upsampled with the aid of decoder prediction means 77, after which it is suitable to be fed to the second input of decoder switching means 87.

The signal generated by first data reprocessing means 89 has the high resolution and forms the difference between a particular group of pels of a particular picture and a particular group of pels of a picture prior thereto. With the aid of addition circuit 84, first decoder memory means 85, first decoder movement compensation means 86 and decoder switching means 87, the particular group of pels of the particular picture then appears at the first (high-resolution) output of the decoder.

Decoder switching means 87 receive the x-signal via the fifth output of demultiplexer 70 because, as long as they are detecting a position code which implies that the respective picture element is situated in the corresponding section of the HDTV picture, the decoder means 90 allow said x-signal to pass unaltered. As soon as decoder means 90 detect a position code which implies that the respective picture element is situated in the exceeding section, they change the x-signal to x=1, as a result of which both layers in the decoder are decoupled. The derivation of the position code, the comparison of said position code with the adjustable code and the intervention in the x-signal take place in the same way as described for the encoder means, and the alternatives mentioned in this connection also apply to the decoder means 90.

The use of multiplexer 6 and demultiplexer 70 is, of course, only one embodiment. Thus, it is conceivable, for example, in video recorders that the transmission of the signals from the encoder to the decoder takes place via normal individual connections, and there are, furthermore, methods other than multiplexing and demultiplexing by which different signals can also be transferred (such as modulation and demodulation techniques). Furthermore, separate multiplexers could be used for each layer in the encoder and separate demultiplexers for each layer in the decoder.

The HDTV picture (16:9) shown in FIG. 3 is made up of 32 areas, with a two-dimensional position code for each area, 1,1 at the top left, 4,1 at the bottom left, 1,8 at the top right and 4,8 at the bottom right. The conventional picture (4:3) is made up of 24 areas, with a two-dimensional position code for each area, 1,2 at the top left, 4,2 at the bottom left, 1,7 at the top right and 4,7 at the bottom right. In this diagram, the corresponding section is represented by the position codes 1,2 . . . 1,7 and 2,2 . . . 2,7 and 3,2 . . . 3,7 and 4,2 . . . 4,7. The exceeding section is represented by the position codes 1,1 and 1,8 and 2,1 and 2,8 and 3,1 and 3,8 and 4,1 and 4,8. By fixing the position of the conventional picture with respect to the HDTV picture by means of a joystick and choosing as adjustable codes, for example, the top-left corner and the bottom-right corner of the conventional picture, it becomes possible to determine for any area whether it is situated in the corresponding section or in the exceeding section by comparing the position code associated therewith with the two adjustable codes. If a corner point of the conventional picture coincides with a corner point of the HDTV picture, it is even sufficient to compare the position code with one adjustable code. Furthermore, position codes other than the two-dimensional codes mentioned here, such as, for example, one-dimensional numbers, are, of course, conceivable, in which case a position code will generally have to be compared with various adjustable codes.

It should be pointed out that the 8×4=32 areas (ratio 8:4 or 16:8) shown in FIG. 3 are insufficient to image an HDTV picture correctly (with the correct ratios). For this purpose, not less than 16×9=144 areas would, after all, be necessary. In that case, the conventional picture would comprise 12×9=108 areas, whereas this picture comprises 6×4=24 areas (ratio 3:2 or 6:4) in FIG. 3. FIG. 3 shows, however, only an arbitrary design, which has been kept as simple as possible. Furthermore, FIG. 3 indicates that the system according to the invention, and the encoder and the decoder according to the invention, must not be interpreted as restricted: the system, the encoder and the decoder are, in principle, suitable for coding and decoding any high-resolution signal (which corresponds to a picture having first dimensions) and any low-resolution signal derived therefrom (which corresponds to a picture having different dimensions).

What is claimed is:

1. An encoder for coding a digital signal, said encoder comprising:

an encoder-input for receiving the digital signal;

first data processing means for generating a first coded digital signal at a first output of the first data processing means and having an input coupled to the encoder-input;

first encoder feedback means, having a first encoder memory means, for feeding-back at least a portion of the first coded digital signal wherein an output of the first encoder memory means is coupled to an input of the first data processing means and an input to the first encoder memory means is coupled to a second output of the first data processing means;

reduction means, having an input coupled to the encoder-input, for filtering and subsampling the received digital signal;

second data processing means for generating a second coded digital signal at a first output of the second data processing means and having an input coupled to an output of the reduction means;

second encoder feedback means, having a second encoder memory means, for feeding-back at least a portion of the second coded digital signal wherein an output of the second encoder memory means is coupled to the input of the second data processing means and an input to the second encoder memory means is coupled to a second output of the second data processing means; and encoder coupling means for coupling the second data processing means to the first data processing means, said encoder coupling means comprising an encoder prediction means for generating an encoder prediction signal;

wherein the encoder further comprises:
      means for deriving a position code from the digital signal, comparing the position code with at least one adjustable code, and transmitting a control signal to the encoder coupling means thereby decoupling, operative as a result of a comparison, the second data processing means and the first data processing means, wherein said deriving, comparing and transmitting means has an input coupled to the encoder input and an output coupled to a control input of the encoder coupling means.

2. The encoder according to claim 1 wherein the encoder coupling means further comprises:

encoder switching means for selecting a picture, such that an output of the encoder switching means is coupled to the input of the first data processing means, a control input to the encoder switching means is coupled to the control input of the encoder coupling means, a first input to the encoder switching means is coupled to the output of the first encoder memory means, a second input to the encoder switching means is coupled to an output of the encoder prediction means, and an input of the encoder prediction means is coupled to the second output of the second data processing means.

3. A decoder for decoding a coded digital signal comprising:

first data reprocessing means for processing a first coded digital signal;

first decoder memory means coupled to the first data reprocessing means;

second data reprocessing means for processing a second coded digital signal;

second decoder memory means coupled to the second data reprocessing means; and decoder coupling means for coupling the second data reprocessing means to the first data reprocessing means, said decoder coupling means comprising a decoder prediction means for generating a decoder prediction signal;

wherein the decoder further comprises:
      means for deriving a position code from the digital signal, comparing the position code with at least one adjustable code, and transmitting a control signal to the decoder coupling means thereby decoupling, operative as a result of a comparison, the second data reprocessing means and the first data reprocessing means, wherein said deriving, comparing and transmitting means has an input for receiving a coded digital signal and an output coupled to a control input of the decoder coupling means.

4. The decoder according to claim 3, wherein the decoder coupling means further comprises:

decoder switching means for selecting a picture, such that an output of the decoder switching means is coupled to the first data reprocessing means, a control input to the decoder switching means is coupled to the control input of the decoder coupling means, a first input to the decoder switching means is coupled to the output of the first decoder memory means, a second input to the decoder switching means is coupled to an output of the decoder prediction means, and an input to the decoder prediction means is coupled to the second data processing means.

5. A coding/decoding system comprising at least one encoder for coding a digital signal and at least one decoder for decoding a coded digital signal wherein said encoder comprises:

an encoder-input for receiving the digital signal;

first data processing means for generating a first coded digital signal at a first output of the first data processing means data and having an input coupled to the encoder-input;

first encoder feedback means, having a first encoder memory means, for feeding back at least a portion of the first coded digital signal such that an output of the first encoder memory means is coupled to the input of the first data processing means and an input to the first encoder memory means is coupled to a second output of the first data processing means;

reduction means for filtering and subsampling the received digital signal having an input coupled to the encoder input;

second data processing means for generating a second coded digital signal at a first output of the second data processing means having an input coupled to an output of the reduction means;

second encoder feedback means, having a second encoder memory means, for feeding-back at least a portion of the second coded digital signal such that an output of the second encoder memory means is coupled to the input of the second data processing means and an input to the second encoder memory means is coupled to a second output of the second data processing means; and encoder coupling means for coupling the second data processing means to the first data processing means;

wherein said decoder further comprises:

first data reprocessing means for reprocessing a first coded digital signal;

first decoder memory means coupled to the first data reprocessing means;

second data reprocessing means for reprocessing a second coded digital signal;

second decoder memory means coupled to the second data reprocessing means; and decoder coupling means for coupling the second data reprocessing means to the first data reprocessing means having a decoder prediction means for generating a decoder prediction signal;

wherein the encoder further comprises:

means for deriving a position code from the digital signal, comparing the position code with at least one adjustable code, and transmitting a control signal to the encoder coupling means thereby decoupling, operative as a result of a comparison, the second data processing means and the first data processing means, wherein said deriving, comparing and transmitting means has an input coupled to the encoder input and an output coupled to a control input of the encoder coupling means.

6. The coding/decoding system according to claim 5 wherein the encoder coupling means further comprises:

encoder switching means for selecting a picture, such that an output of the encoder switching means is coupled to the input of the first data processing means, a control input to the encoder switching means is coupled to the control input of the encoder coupling means, a first input to the encoder switching means is coupled to the output of the first encoder memory means, a second input to the encoder switching means is coupled to an output of the encoder prediction means, and an input to the encoder prediction means is coupled to the second output of the second data processing means.

7. The coding/decoding system according to claim 6 wherein the decoder further comprises:

means for deriving the position code from a coded digital signal and for receiving at least one adjustable code, comparing the position code with the adjustable code, and transmitting a control signal to the decoder coupling means thereby decoupling, operative as a result of a comparison, the second data reprocessing means and the first data reprocessing means, wherein said deriving, comparing and transmitting means has an input for receiving a coded digital signal and an output coupled to a control input of the decoder coupling means.

8. The coding/decoding system according to claim 7 wherein the decoder coupling means further comprises:

decoder switching means for selecting a picture, of which an output of the decoder switching means is coupled to the first data reprocessing means, a control input to the decoder switching means is coupled to the control input of the decoder coupling means, a first input to the decoder switching means is coupled to the output of the first decoder memory means, a second input to the decoder switching means is coupled to an output of the decoder prediction means and an input to the decoder prediction means is coupled to the second data processing means.

9. The coding/decoding system according to claim 5 wherein the decoder further comprises:

means for deriving the position code from a coded digital signal and for receiving at least one adjustable code, comparing the position code with the adjustable code, and transmitting a control signal to the decoder coupling means thereby decoupling, operative as a result of a comparison, the second data reprocessing means and the first data reprocessing means, wherein said deriving, comparing and transmitting means has an input for receiving a coded digital signal and an output coupled to a control input of the decoder coupling means.

10. The coding/decoding system according to claim 9 wherein the decoder coupling means further comprises:

decoder switching means for selecting a picture, of which an output of the decoder switching means is coupled to the first data reprocessing means and of which a control input to the decoder switching means is coupled to the control input of the decoder coupling means and of which a first input to the decoder switching means is coupled to the output of the first decoder memory means and of which a second input to the decoder switching means is coupled to an output of the decoder prediction means of which an input to the decoder prediction means is coupled to the second data processing means.

* * * * *

UNITED STATES PATENT AND TRADEMARK OFFICE
CERTIFICATE OF CORRECTION

PATENT NO. : 5,510,787

DATED : April 23, 1996

INVENTOR(S) : Arian Koster

It is certified that error appears in the above-identified patent and that said Letters Patent is hereby corrected as shown below:

Drawing, Figure 2,
   Block 70            Delete "MULTIPLEXER" and replace with
                            --DEMULTIPLEXER--.

Signed and Sealed this

Third Day of September, 1996

Attest:

BRUCE LEHMAN

Attesting Officer           Commissioner of Patents and Trademarks